UNITED STATES PATENT OFFICE.

ERNEST E. WERNER, OF INDIANAPOLIS, INDIANA.

METHOD OF TREATING CEREALS AND CEREAL PRODUCTS.

1,222,830.

Specification of Letters Patent.

Patented Apr. 17, 1917.

No Drawing.

Application filed May 13, 1913. Serial No. 767,403.

*To all whom it may concern:*

Be it known that I, ERNEST E. WERNER, a citizen of the United States, residing at Indianapolis, Marion county, and State of Indiana, have invented and discovered certain new and useful Improvements in Methods of Treating Cereals and Cereal Products, of which the following is a specification.

This invention relates to a new treatment for improving certain qualities of cereal products, or of wheat and other cereals prior to grinding. Cereals grown in certain kinds of soils and under the influence of certain climates supply meal the glutinous, *i. e.*, nitrogenous, *i. e.*, protein substance of which is of inferior quality and it is found difficult, if not impossible, to produce from such meal approved baking products.

The object of this invention is to improve the quality of the cereal product and the method consists broadly stated, of treating the cereal products prior or subsequent to milling or grinding, with ammonium persulfate, $(N_4H)S_2O_8$, which may be alone used or used in the presence of phosphoric acid, $H_3PO_4$, or the anhydrate of the latter $P_2O_5$.

In practising the process the salt used is of such ready solubility that it is capable of being dissolved in a relatively small volume of water such as the inherent moisture contained in the cereal product itself without the necessity of adding another solvent, and when thus dissolved is capable of producing an enzym stimulation, that is to say, an observable beneficial influence upon fermentation during baking.

In treating the cereals before grinding, however, a mechanical difficulty exists to the utilization of the moisture merely carried by the grain itself, since in this form the salt cannot readily combine with the moisture. Hence, in treating the cereals by this process, the compound is added in the state of solution to the cereal which solution may be obtained either by forming a distinct and preliminary solution of the compound before applying it to the grain or by utilizing the liquid containing the cereal at one state in the treating of the grains.

For the purpose of milling cereals it is customary to steep them for certain lengths of time with quantities of water suitable to the particular kind and grade under preparation. To this steeping liquid which may in itself provide the solution agent I add the $(NH_4)S_2O_8$ either with or without the addition to the liquid of the $H_3PO_4$ or the $P_2O_5$. When using the $(NH_4)S_2O_8$ alone I find that extremely small quantities will produce the desired result. From .01% to .001% will suffice and it is improbable that the action taking place is one due to the mass of the added material, but probably to a stimulating action upon the enzyms contained in the treated material. When using the $(NH_4)S_2O_8$ in the presence of the $H_3PO_4$ or $P_2O_5$ the action becomes more active and the mass used still smaller. When so treated I have obtained results when adding only .00001% and it is obvious that the result so obtained cannot be due to the mass, but rather to some peculiar accelerating properties of the combined chemicals so introduced. I am unable to state just what this action consists of, since the chemistry of the proteins is very obscure and many of them change very readily into other substances and the distinctions between the different varieties are by no means well defined. Further, the orthophosphoric acid under influences to which the grain so treated is readily and constantly subjected will itself undergo changes, as is well known to those skilled in the art, into pyrophosphoric, $H_4P_2O_7$, and metaphosphoric, $HPO_3$, or $PO_2OH$, acids.

When grain so treated is ground into flour considerable change may be observed. The color of the bread is materially bettered as is the texture, and in consequence the nutritive quality, and the gluten will absorb and retain moisture to a better and greater extent. I have observed that so-called ricey, *i. e.*, starchy, grains respond readily to the treatment as do also grains of other nature.

The utility of this process lies in the fact that the bulk of nitrogenous matter occurring in grain is found adjacent to the skin or bran of the berry and obviously during the process of steeping it is reached and treated to the fullest extent. To this may be due the fact that even ricey and starchy cereals are beneficially affected by this treatment.

When the process is applied to the treatment of flour or other meal, the addition is also preferably in the form of a solution.

But normal flour contains from 12% to 14% of water and I find in practice that a gradual but constant improvement in the quality of the flour treated by the addition of dry ammonium persulfate, continues to take place after such treatment, which is doubtless due in part to the extreme solubility of ammonium persulfate in water and the consequent diffusion of the salt throughout the mass.

Having thus fully described my said invention, what I claim as new, and desire to secure by Letters Patent is:

1. The process of treating cereals or cereal products by adding to them ammonium persulfate.

2. The process of treating cereals by steeping them prior to grinding in a liquid containing ammonium persulfate, $(NH_4)S_2O_8$.

3. The process of treating cereals by steeping them prior to grinding in a liquid containing ammonium persulfate and phosphoric acid, $H_3PO_4$, or $P_2O_5$.

In witness whereof, I have hereunto set my hand and seal at Washington, District of Columbia, this thirteenth day of May, A. D. nineteen hundred and thirteen.

ERNEST E. WERNER. [L. S.]

Witnesses:
E. W. BRADFORD,
J. D. YOAKLEY.